United States Patent [19]

Greenwood et al.

[11] Patent Number: 5,203,912
[45] Date of Patent: Apr. 20, 1993

[54] ANIONIC DYE

[75] Inventors: David Greenwood; Nigel Hughes, both of Oldham; Ronald W. Kenyon, Manchester, all of England; Suraj L. Hindagolla, Corvallis, Oreg.

[73] Assignee: Imperial Chemical Industries PLC, London, England

[21] Appl. No.: 719,342

[22] Filed: Jun. 24, 1991

Related U.S. Application Data

[62] Division of Ser. No. 398,369, Aug. 24, 1989, Pat. No. 5,053,495.

[30] Foreign Application Priority Data

Aug. 24, 1988 [GB] United Kingdom ............... 8820117
Jun. 12, 1989 [GB] United Kingdom ............... 8913460

[51] Int. Cl.$^5$ .............................................. C09D 11/02
[52] U.S. Cl. ................................. 106/22 K; 534/836; 534/837; 534/824; 8/673
[58] Field of Search ............... 106/20, 22; 534/836, 534/837, 824; 8/673

[56] References Cited

U.S. PATENT DOCUMENTS

| | | | |
|---|---|---|---|
| 3,963,418 | 6/1976 | Tullio | 534/728 X |
| 4,083,840 | 4/1978 | Schoefberger | 534/836 X |
| 4,626,284 | 12/1986 | Ohta et al. | 534/829 X |
| 4,703,113 | 10/1987 | Baxter et al. | 534/728 X |
| 4,752,337 | 6/1988 | Kunde | 534/829 X |
| 4,963,189 | 10/1990 | Hindagolla | 106/20 |

FOREIGN PATENT DOCUMENTS

| | | | |
|---|---|---|---|
| 1054816 | 4/1959 | Fed. Rep. of Germany | 534/836 |
| 60-81249 | 5/1985 | Japan | 534/829 |
| 60-108470 | 6/1985 | Japan | 534/829 |

OTHER PUBLICATIONS

Colour Index, 3rd ed., vol. 4, No. 27720, p. 4251.
Dainippon, Chemical Abstracts, vol. 99, No. 72344g (1983).
Levchenkova et al, Chemical Abstracts, vol. 95, No. 44707b (1984).

*Primary Examiner*—Mark L. Bell
*Assistant Examiner*—Helene Klemanski
*Attorney, Agent, or Firm*—Cushman, Darby & Cushman

[57] ABSTRACT

A dye which, in the free acid form, has the formula

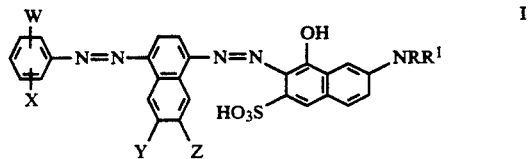

wherein
W is COOH
X is selected from H, COOH, SO$_3$H, halo, hydroxy, nitro, cyano, C$_{1-6}$-alkyl, C$_{1-6}$-alkoxy and C$_{1-6}$-acylamino;
Y is H, COOH or SO$_3$H;
Z is H, COOH or SO$_3$H;
R & R$^1$ are each independently H or C$_{1-6}$-alkyl substituted by 0, 1 or 2 —COOR$^2$ groups; and
R$^2$ is H or C$_{1-6}$-alkyl;

provided that there are at least two COOH groups and that the number of COOH groups is equal to or greater than the number of SO$_3$H groups.

The dye is adapted for the preparation of inks for use in ink jet printing in which it displays high water-fastness on paper.

25 Claims, No Drawings

ANIONIC DYE

This is a division of application No. 07/398,369, filed Aug. 24, 1989 now U.S. Pat. No. 5,033,495.

This specification describes an invention relating to an anionic dye and particularly a black anionic dye which has differential water-solubility dependent upon pH.

According to the present invention there is provided a dye which, in the free acid form, has the formula:

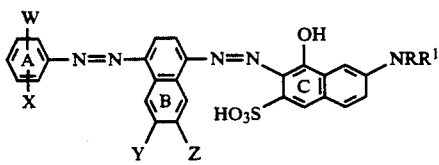   I wherein
W is COOH
X is H, COOH, SO$_3$H, halo, hydroxy, nitro, cyano, C$_{1-6}$-alkyl, C$_{1-6}$-alkoxy, or C$_{1-6}$-acylamino;
Y is H, COOH or SO$_3$H;
Z is H, COOH or SO$_3$H;
R & R$^1$ are each independently H or C$_{1-6}$-alkyl substituted by 0, 1 or 2 -COOR$^2$ groups;
R$^2$ is H or C$_{1-6}$-alkyl;
provided that there are at least two COOH groups and that the number of COOH groups is equal to or greater than the number of SO$_3$H groups.

X is preferably selected from SO$_3$H, chloro, bromo, hydroxy, nitro, cyano, C$_{1-4}$-alkyl especially methyl, C$_{1-4}$-alkoxy especially methoxy, C$_{1-4}$-alkylcarbonylamino, especially acetamido and, more especially, from H and COOH.

It is preferred that R$^2$ is H, methyl or ethyl.

It is especially preferred that X is H or COOH; R$^1$ is H; and R is H, CH$_2$COOH or CH$_2$CH$_2$COOH.

It is preferred that the dye of Formula I contains from 2 to 4 COOH groups. It is also preferred that at least one, and more especially at least two, COOH groups are attached directly to aromatic carbon atoms.

Where X is H, the COOH group on Ring A may be in the ortho, meta or para position with respect to the azo group but is preferably in the meta or para position. However, it is preferred that X is COOH and that the two COOH groups are in the 3,5-, 3,4- or 2,5- positions on Ring A.

It is preferred that there are not more than two SO$_3$H groups, i.e. that only one of X, Y and Z is SO$_3$H. It is also preferred that there are the same number of COOH and SO$_3$H groups or an excess of 1 or 2 COOH groups.

Examples of diazo components from which Ring A may be derived are

| | |
|---|---|
| 2-aminobenzoic acid | 3-amino-6-chlorobenzoic acid |
| 3-aminobenzoic acid | 2-amino-4-chlorobenzoic acid |
| 4-aminobenzoic acid | 2-amino-5-chlorobenzoic acid |
| 2-aminophthalic acid | 3-amino-4-chlorobenzoic acid |
| 3-aminophthalic acid | 2-chloro-3-aminobenzoic acid |
| 4-aminoisophthalic acid | 2-chloro-4-aminobenzoic acid |
| 5-aminoisophthalic acid | 2-amino-5-bromobenzoic acid |
| 2-aminoisophthalic acid | 3-amino-4-fluorobenzoic acid |
| 2-aminoterephthalic acid | 2-amino-5-methylbenzoic acid |
| 2-amino-6-methylbenzoic acid | 3-amino-2-methylbenzoic acid |
| 3-methyl-4-aminobenzoic acid | 3-hydroxy-4-aminobenzoic acid |
| 3-amino-4-methylbenzoic acid | 3-amino-5-hydroxybenzoic acid |
| 3-amino-4-methoxybenzoic acid | 3-amino-4-hydroxybenzoic acid |
| 3-methoxy-4-aminobenzoic acid | 2-hydroxy-3-aminobenzoic acid |
| 2-n-butoxy-4-aminobenzoic acid | 2-amino-4-nitrobenzoic acid |
| 2-amino-5-sulphobenzoic acid | 3-nitro-4-aminobenzoic acid |
| 2-amino-4-sulphobenzoic acid | 3-amino-5-nitrobenzoic acid |
| 2-amino-6-hydroxybenzoic acid | 2-nitro-3-aminobenzoic acid |
| 2-hydroxy-5-aminobenzoic acid | 2-nitro-5-aminobenzoic acid |
| 2-amino-5-hydroxybenzoic acid | 3-acetylamino-5-aminobenzoic acid |

Examples of suitable couplers from which the central group B is derived are:

| | |
|---|---|
| 1,6-Cleves acid | 8-amino-2-naphthoic acid |
| 1,7-Cleves acid | 5-amino-2-naphthoic acid |
| Mixed Cleves acids | 5-amino-2,3-dicarboxynaphthalene |

Examples of suitable couplers from which the third group C is derived are:

| | |
|---|---|
| Gamma acid | N-butyl-Gamma acid |
| N-methyl-Gamma acid | N-carboxymethyl-Gamma acid |
| N,N-dimethyl-Gamma acid | N,N-di(carboxymethyl)-Gamma acid |
| N,N-diethyl-Gamma acid | N-(beta-carboxyethyl)-Gamma acid |

Examples of suitable compounds of Formula I are given in the following table:

| X | W | Y | Z | R | R$^1$ |
|---|---|---|---|---|---|
| 3-COOH | 5-COOH | H | H | H | H |
| 3-COOH | 5-COOH | COOH | H | H | H |
| 3-COOH | 5-COOH | H | COOH | H | H |
| 3-COOH | 5-COOH | H | SO$_3$H | H | H |
| 3-COOH | 5-COOH | SO$_3$H | H | H | H |
| 3-COOH | 5-COOH | COOH | COOH | H | H |
| H | 4-COOH | H | COOH | H | H |
| 3-COOH | 4-COOH | H | H | CH$_2$COOH | CH$_3$ |
| 2-COOH | 5-COOH | H | SO$_3$H | CH$_2$COOH | H |
| 3-COOH | 5-COOH | SO$_3$H | H | CH$_2$COOH | H |
| 3-COOH | 5-COOH | H | H | C$_2$H$_4$COOH | H |
| 3-COOH | 5-COOH | H | COOH | CH$_2$COOH | H |
| 3-COOH | 5-COOH | H | SO$_3$H | CH$_2$COOH | H |
| 3-COOH | 5-COOH | H | SO$_3$H | C$_2$H$_4$COOH | H |
| 3-COOH | 5-COOH | H | H | CH$_2$COOH | H |
| H | 3-COOH | COOH | H | H | H |
| H | 3-COOH | H | COOH | H | H |
| H | 2-COOH | H | H | H | H |
| H | 4-COOH | H | COOH | CH$_2$COOH | CH$_2$COOH |
| 2-COOH | 5-COOH | H | H | CH$_3$ | CH$_3$ |
| 2-COOH | 3-COOH | H | H | C$_2$H$_5$ | C$_2$H$_5$ |
| 2-COOH | 4-COOH | H | SO$_3$H | H | H |
| 3-COOH | 4-COOH | H | H | H | C$_4$H$_9$ |
| 3-CH$_3$ | 5-COOH | H | SO$_3$H | H | H |
| 2-CH$_3$ | 5-COOH | H | SO$_3$H | H | H |
| 3-Cl | 6-COOH | H | SO$_3$H | H | H |
| 2-OCH$_3$ | 5-COOH | H | SO$_3$H | H | H |
| 3-SO$_3$H | 6-COOH | H | SO$_3$H | H | H |
| 4-SO$_3$H | 6-COOH | H | SO$_3$H | H | H |

In the form of salts with a base, especially an alkali metal, ammonia or substituted ammonia and mixtures thereof, at pH 7.5 and above, especially from pH 7.5 to 9.0, dyes of Formula I are very soluble in water, generally to the extent of 10% or more by weight. However, the water-solubility drops sharply below pH 7.5 and below pH 6 they are virtually insoluble in water and aqueous media.

The present dye can be converted into its salt with ammonia or an amine by dissolving the dye in the form or a salt with an alkali metal, acidifying with a mineral acid, adjusting the solution of pH 9-9.5 with ammonia or the amine and removing alkali metal chloride ions by dialysis.

The present dyes can be made by diazotising a compound which in the free acid form is of the formula:

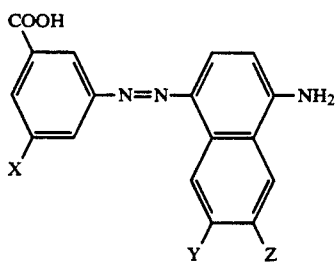

and coupling with a substituted naphthalene of the formula:

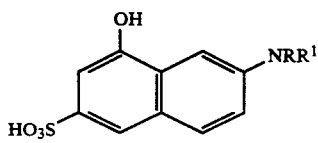

It has been found that a dye of Formula I can be dissolved in an aqueous medium above pH 7.5, preferably from pH 7.5 to pH 9, at normal concentrations which, depending on type of ink required can be up to 20% by weight, but is preferably from 5 to 15% by weight, so that it can be applied, by any suitable technique, especially ink-jet printing, to a paper substrate. After application of the ink to the substrate and evaporation of the solvent, the dye is at a pH determined by the surface of the paper substrate. The natural pH of many paper substrates is such that the dye will be be in an environment from pH 5 to 7. Because the water-solubility of the dye is much lower below pH 7 and virtually zero at pH 6, it will be more resistant to removal from the substrate by washing, i.e. it will have a high water-fastness.

We have found also that the water-fastness of the dyes on the paper is increased if they are printed from an aqueous medium in the form of an ammonium or substituted ammonium salt. Examples of amines used to form such salts include methylamine, dimethylamine, trimethylamine, ethylamine, n-propylamine, isopropylamine, n-butylamine, iso-butylamine, sec-butylamine, tert-butylamine, piperidine, pyridine, morpholine, allylamine, diethylamine, triethylamine and mixtures thereof. It is not essential that the dyes are completely in the form of the ammonium salt or substituted ammonium salt and mixed alkali metal and either ammonium salt or substituted ammonium salt are effective, especially those in which at least 50% of the cations are ammonium or substituted ammonium ions.

If the natural pH value of the paper surface is significantly above pH 6, this can be adjusted downwards, by the addition to the ink of a salt of an acid with a volatile base, such as ammonia. When the ink dries the base evaporates to leave the free acid which will lower the pH of the paper surface in the region of the dye. To minimise damage to the paper it is preferred to use a weak acid, such as acetic acid.

A suitable ink comprises a solution of one or two dyes according to Formula I in an aqueous medium.

The ink preferably contains from 0.5% to 20%, more preferably from 0.5% to 15%, and especially from 1% to 10%, by weight of the dye based on the total weight of the ink.

Liquid media used for preparing the present ink include water and mixtures of water with various water-soluble organic solvents. The water-soluble organic solvents include $C_1$–$C_4$ alkanols such as methanol, ethanol, n-propanol, isopropanol, n-butanol, sec-butanol, tert-butanol, isobutanol; amides such as dimethyl-formamide and dimethylacetamide; ketones or ketone alcohols such as acetone and diacetone alcohol; ethers such as tetrahydrofuran and dioxane; polyalkylene glycols such as polyethylene glycol and polypropylene glycol; alkylene glycols and thioglycols containing $C_2$–$C_6$ alkylene groups such as ethylene glycol, propylene glycol, butylene glycol, triethylene glycol; thiodiglycol, hexylene glycol, and diethylene glycol; other polyols such as glycerol, 1,2,6-hexanetriol; and lower alkyl ethers of polyhydric alcohols such as 2-methoxyethanol, 2-(2-methoxyethoxy)ethanol, 2-(2-ethoxyethoxy)ethanol, 2-[2-(2-methoxyethoxy)ethoxy]ethanol and 2-[2-(2-ethoxyethoxy)-ethoxy]-ethanol.

Preferred water-soluble organic solvents among these are glycols and glycol ethers, such as ethylene glycol, diethylene glycol, triethylene glycol and 2-methoxy-2-ethoxy-2-ethoxyethanol; and polyethylene glycols with molecular weights up to 500. A preferred specific solvent mixtures is a binary mixture of water and diethylene glycol.

A suitable process for the application of an ink as hereinbefore defined to a paper substrate comprises forming the ink into small droplets by ejection from a reservoir through a small orifice by the application of heat so that the droplets of ink are directed at the paper substrate.

This printing process is conventionally referred to as thermal ink jet printing and is used to form a record on the paper substrate by the programmed application of pulses of heat to the ink adjacent to the orifice during relative movement between the paper substrate and the reservoir.

The invention is further illustrated by the following Examples in which all parts and percentages are by weight unless otherwise indicated.

EXAMPLE 1

Stage 1

1-amino-4-(3,5-dicarboxyphenylazo)-7-sulphonaphthalene

5-Aminoisophthalic acid (18.1 g, 0.1M) was stirred in water (150 ml) at room temperature and 2N NaOH added to form a solution at pH 8.0. 2N $NaNO_2$ solution (50 ml) was added and the mixture stirred to homogenise. The solution was added gradually to a mixture of ice/water (150 ml) and 36% HCl (50 ml) at 5° C. and the resulting suspension stirred for ½ hour at 50° C. Sulphamic acid solution (10%) was added in order to remove excess nitrous acid.

1,7-Cleves acid (22.3 g, 0.1M) was dissolved in water (150 ml) and 32% NaOH solution at pH 8.5. $Na_2CO_3$ (10 g) was added and the solution cooled to 10° C. To this solution was added the above diazo suspension at pH 8.0 to pH 9.0 by the addition of $Na_2CO_3$ solution (20%). The orange solution was stirred for 1 hour at 10° C.

10% NaCl (w/v) was added followed by 36% HCl to pH 5.0. The precipitated dye was collected by filtration and washed with NaCl solution (10%, 200ml).

Stage 2

The paste from Stage 1 (0.1M) was and 2N NaOH solution at pH 9.0. 2N NaNO$_2$ solution (50 ml) was added and the mixture stirred 3 minutes. The solution was added gradually to a mixture of ice/water (150 ml) and 36% HCl (50 ml) at 5° C. using rapid agitation. The resulting suspension was stirred 1 h at 5° C. Sulphamic acid solution (10%) was added in order to remove excess nitrous acid.

Gamma acid (23.9 g, 0.1M) was dissolved in water (150 ml) and 2N NaOH solution at pH 9.0. Na$_2$CO$_3$ (10 g) was added and the solution cooled to 10° C. To this was added the above diazo suspension, while holding the pH at 8.0 to pH 9.0 with 20% Na$_2$CO$_3$ solution. The solution was stirred for 1 hour at 10° C. and the pH adjusted to 5.5 by the addition of glacial acetic acid.

The precipitated dye was collected by filtration and washed with dilute acetic acid solution (5%). The paste was redissolved in water (150 ml) and 2N NaOH solution at pH 9.0. The solution was heated to 50° C. and NaCl (15% w/v) added and the precipitated dye collected by filtration and washed with 10% NaCl solution (100 ml). The product was the tetrasodium salt of 1-hydroxy-2-(4-[3,5-dicarboxy-phenylazo]-7-sulphonaphth-1-ylazo)-3-sulpho-7-aminonaphthalene.

EXAMPLE 2

Stage 1

1-Amino-4-(3,5-dicarboxyphenylazo)naphthalene

5-Aminoisophthalic (18.1 g, 0.1M) was diazotised by the method of Example 1.

1-Naphthylamine (14.3 g, 0.1M) was dissolved in water (300 ml) and 36% HCl (15 ml) at 70° C. and cooled to room temperature. The resulting suspension was added to the above diazo suspension at 10° C. and the pH adjusted to 4.5 by the addition of sodium acetate. The mixture was stirred for 18 hours and the dye collected by filtration and washed with water (100 ml).

Stage 2

The paste from Stage 1 (0.1M) was then reacted with Gamma acid by the method of Example 1, Stage 2. The product was the trisodium salt of 1-hydroxy-2-(4-[3,5-dicarboxyphenylazo]-naphth-1-ylazo)-3-sulpho-7-aminonaphthalene.

Examples of specific inks are:

| Ink | Dye No. (parts) | Liquid medium and other components (parts) |
| --- | --- | --- |
| 1 | 1 (2.5) | Water (60) |
|   |         | Ethylene glycol (40) |
| 2 | 2 (2.5) | as Ink 1 |
| 3 | 1 (4.0) | Water (85) |
|   |         | Diethylene glycol (15) |
| 4 | 2 (4.0) | as Ink 3 |
| 5 | 1 (5.0) | Water (90) |
|   |         | Diethylene glycol (10) |
| 6 | 2 (5.0) | as Ink 5 |
| 7 | 1 (5.0) | Water (65) |
|   |         | Glycerol (25) |
|   |         | Triethanolamine (10) |
| 8 | 2 (3.0) | as Ink 7 |
| 9 | 1 (3.5) | Water (80) |
|   |         | Ethylene glycol (15) |
|   |         | Polyethylene glycol (MW 200) (5) |
| 10 | 2 (3.5) | as Ink 9 |

When each of these inks was printed onto plain paper using a piezo or thermal ink-jet printing machine, the printed image obtained had high resistance to water.

EXAMPLE 3

The dye obtained as in Example 1 was stirred in water (400 ml) at pH 8-9 until a complete solution was obtained. The solution was then slowly added to a mixture of concentrated hydrochloric acid (45 ml) and water (50 ml) and the suspension stirred for 30 minutes and then filtered.

The paste was stirred in water (300 ml) and conc.ammonium hydroxide added to raise the pH to 9-9.5. The solution was then dialysed to remove chloride ions and then evaporated to give the mixed ammonium sodium salt of 1-hydroxy-2-(4-[3,5-dicarboxyphenylazo]-7-sulphonaphth-1-ylazo)-3-sulpho-7-aminonaphthalene.

Inks were prepared as in Example 2 and when printed onto plain paper using a thermal ink jet printing machine, the printed image obtained had very high resistance to water. When the paper carrying the printed image was immersed in water or sprayed with a jet of water there is virtually no colour loss or deterioration of print quality.

EXAMPLE 4

(a) In place of the ammonium hydroxide used in Example 3 there were used separately methylamine, dimethylamine and trimethylamine to give the respective mixed amine-sodium salts of 1-hydroxy-2-(4-[3,5-dicarboxyphenylazo]-7-sulphonaphth-1-ylazo)-3-sulpho7-aminonaphthalene.

Inks were prepared as in Example 2 and when printed onto plain paper using a thermal ink jet printing machine, the printed image obtained had a very high resistance to water.

(b) In place of ammonium hydroxide used in Example 3 there may be used ethylamine, n-propylamine, iso-propylamine, n-butylamine, iso-butylamine, sec-butylamine, tert-butylamine, piperidine, pyridine, morpholine, allylamine, diethylamine, triethylamine.

EXAMPLE 5

The dye prepared as in Example 2 was converted to the mixed ammonium-sodium salt by the method of Example 3.

When converted to an ink and printed onto plain paper using a thermal ink-jet printing machine the printed image obtained has very high resistance to water.

EXAMPLE 6

In place of the 18.1 g of 5-aminoisophthalic acid used in Example 2 there is used 18.1 g of 4-aminophthalic acid. The product 1-hydroxy-2-(4-[3,4-dicarboxyphenylazo]naphth-1-ylazo)-3-sulpho-7-aminonaphthalene was converted to the mixed ammonium-sodium salt by the method of Example 3. When made into an ink and printed onto plain paper using a thermal ink jet printing machine, the printed image has a very high resistance to water.

EXAMPLE 7

In place of the 22.39 of 1,7-Cleves acid used in Example 1 there is used 22.3 g of 1,6-Cleves acid. The product 1-hydroxy-2-(4-[3,5-dicarboxyphenylazo]-6-sulphonaphth-1-ylazo)-3-sulpho-7-aminonaphthalene was converted to the mixed ammonium-sodium salt by the method of Example 3. When made into an ink and printed onto plain paper using a thermal ink jet printing machine the printed image showed very high resistance to water.

EXAMPLE 8

In place of the 22.3 g of 1,7-Cleves acid used in Example 1 there is used 18.79 of an approximately 50/50 mixture of 5-amino-2-naphthoic acid and 8-amino-2-naphthoic acid. The product consisted of a mixture of 1-hydroxy-2-(4-[3,5-dicarboxyphenylazo]-6-carboxynaphth-1-ylazo)-3-sulpho-7-aminonaphthalene and 1-hydroxy-2-(4-[3,5-dicarboxyphenylazo]-7-carboxynaphth-1-ylazo)-3-sulpho-7-aminonaphthalene. It was converted to the mixed ammonium-sodium salt by the method of Example 3. When made into an ink and printed onto plain paper using a thermal ink jet printing machine the printed image showed very high resistance to water.

EXAMPLE 9

In place of the 23.9 g of Gamma-acid used in Example 1 there is used 29.7 g of N-carboxymethyl-Gamma acid. The product 1-hydroxy-2-(4-[3,5-dicarboxyphenylazo]-6-sulphonaphth-1-ylazo)-3-sulpho-7-carboxymethylaminonaphthalene was converted to the mixed ammonium-sodium salt by the method of Example 3. When made into an ink and printed onto plain paper using a thermal ink jet machine the printed image showed high resistance to water.

EXAMPLE 10

In place of the 23.9 g of Gamma-acid used in Example 1 there is used 31.1 g of N-beta-carboxyethyl-Gamma acid. The product 1-hydroxy-2-(4-[3,5-dicarboxyphenylazo]-6-sulphonaphth-1-ylazo)-3-sulpho-7-beta-carboxyethylaminonaphthalene was converted to the mixed ammonium-sodium salt by the method of Example 3. When made into an ink and printed onto plain paper using a thermal ink jet machine, the printed image showed high resistance to water.

EXAMPLE 11

In place of the 23.9 g of Gamma-acid used in Example 2 there is used 29.79 of N-carboxymethyl-Gamma acid. The product 1-hydroxy-2-(4-[3,5-dicarboxyphenylazo]-naphth-1-ylazo)-3-sulpho-7-carboxymethylaminonaphthalene was converted to the mixed ammonium-sodium salt by the method of Example 3. When made into an ink and printed onto plain paper using a thermal ink jet machine the printed image showed high resistance to water.

EXAMPLE 12

In place of the 23.9 g of Gamma-acid used in Example 2 there is used 31.1 g of N-beta-carboxyethyl-Gamma acid. The product 1-hydroxy-2-(4-[3,5-dicarboxyphenylazo]-naphth-1-ylazo)-3-sulpho-7-beta-carboxyethylaminonaphthalene was converted to the mixed ammonium-sodium salt by the method of Example 3. When made into an ink and printed onto plain paper using a thermal ink jet machine the printed image showed high resistance to water.

EXAMPLE 13

In place of the 18.1 g of 5-aminoisophthalic acid used in Example 8 there is used 13.7 g of p-aminobenzoic acid. The product consists of a mixture of 1-hydroxy-2-(4-[4-carboxyphenylazo]-6-carboxynaphth-1-ylazo)-3-sulpho-7-aminonaphthalene and 1-hydroxy-2-(4-{4-carboxyphenylazo]-7-carboxynaphth-1-ylazo)-3-sulpho-7-aminonaphthalene.

It was converted to the mixed ammonium-sodium salt by the method of Example 3. When made into an ink and printed onto plain paper using a thermal ink jet machine the printed image showed high resistance to water.

EXAMPLE 14

In place of the 13.7 g of p-aminobenzoic acid used in Example 13 there is used 13.7 g of m-aminobenzoic acid. The product consists of a mixture of 1-hydroxy-2-(4-[3-carboxyphenylazo]-6-carboxynaphth-1-ylazo)-3-sulpho-7-aminonaphthalene and 1-hydroxy-2-(4-[3-carboxyphenylazo]-7-carboxyaaphth-1-ylazo)-3-sulpho-7-aminonaphthalene. When converted to the mixed ammonium-sodium salt by the method of Example 3 and made into an ink and printed onto plain paper using a thermal ink jet machine the printed image showed high resistance to water.

EXAMPLE 15

In place of the 13.7 g of p-aminobenzoic acid used in Example 13 there is used 13.7 g of anthranilic acid. The product consists of a mixture of 1-hydroxy-2-(4-[2-carboxyphenylazo]-6-carboxynaphth-1-ylazo)-3-sulpho-7-aminonaphthalene and 1-hydroxy-2-(4-[2-carboxyphenylazo]-7-carboxynaphth-1-ylazo)-3-sulpho-7-aminonaphthalene. It was converted to the mixed ammonium-sodium salt by the method of Example 3. When made into an ink and printed onto plain paper using a thermal ink jet machine the printed image showed high resistance to water.

EXAMPLE 16

In place of the 18.1 g of 5-aminoisophthalic acid used in Example 2 there is used 18.1 g of aminoterephthalic acid. The product 1-hydroxy-2-(4-[2,5-dicarboxyphenylazo]naphth-1-ylazo)-3-sulpho-7-aminonaphthalene was converted to the mixed ammonium-sodium salt by the method of Example 3. When made into an ink and printed onto plain paper using a thermal ink jet printing machine the printed image had a high resistance to water.

EXAMPLE 17

In place of the 18.1 g of 5-aminoisophthalic acid used in Example 2 there is used 18.1 g of 3-aminophthalic acid. The product 1-hydroxy-2-(4-[2,3-dicarboxyphenylazo]naphth-1-ylazo)-3-sulpho-7-aminonaphthalene was converted to the mixed ammonium-sodium salt by the method of Example 3. When made into an ink and printed onto plain paper using a thermal ink jet printing machine the printed image had a high resistance to water.

EXAMPLE 18

In place of the 22.3 g of 1,7-Cleves acid used in Example 1 there is used 23.1 g of 5-amino-2,3-dicarboxynaphthalen. The product 1-hydroxy-2-(4-[3,5-dicarboxyphenylazo]-6,7-dicarboxynaphth-1-ylazo)-3-sulpho-7-aminonaphthalene was converted to the mixed ammonium-sodium salt by the method of Example 3. When made into an ink and printed onto plain paper using a thermal ink jet printing machine the printed image showed high resistance to water.

EXAMPLE 19

In place of the 18.1 g of 5-aminoisophthalic acid used in Example 1 there is used 18.1 g of 4-aminoisophthalic acid. The product 1-hydroxy-2-(4-[2,4-dicarboxyphenylazo]-7-sulpho-naphth-1-ylazo)-3-sulpho-7-aminonaphthalene was converted to the mixed ammonium-sodium salt by the method of Example 3. When made into an ink and printed onto plain paper using a thermal ink jet printing machine

EXAMPLE 20

In place of the 18.1 g of 5-aminoisophthalic acid used in Example 2 there is used 18.1 g of 4-aminoisophthalic acid. The product 1-hydroxy-2-(4-[2,4-dicarboxyphenylazo]-naphth-1-ylazo)-3-sulpho-7-aminonaphthalene was converted to the mixed ammonium-sodium salt by the method of Example 3. When made into an ink and printed onto plain paper using a thermal ink jet printing machine the printed image showed very high resistance to water.

EXAMPLE 21

The dye obtained as in Example 1 was stirred in water (400 ml) at pH 8-9 until a complete solution was obtained. The solution was acidified with concentrated hydrochloric acid until the pH falls below 3. The precipitate was filtered off, added to water (400 ml) and concentrated ammonium hydroxide added until the pH was 7.5-8.0. The solution was then acidified with concentrated hydrochloric acid and the precipitated dye filtered off. After repeating the ammonia addition and reprecipitation with acid three times and finally dissolving in water by adding ammonium hydroxide to pH 8, the solution was dialysed to remove chloride ions and then evaporated. The product was virtually 100% ammonium salt of 1-hydroxy-2-(4-[3,5-dicarboxyphenylazo]-7-sulphonaphth-1-ylazo)-3-sulpho-7-aminonaphthalene.

When converted to an ink and printed onto plain paper using a thermal ink-jet printing machine, the printed image obtained has very high resistance to water. When the paper carrying the printed image was immersed in water or sprayed with a jet of water there is virtually no colour loss or deterioration of print quality.

Alternatively, the ammonium salt of the dye of Example 1 can be obtained by passing a solution of the sodium salt of the dye down a column containing the ammonium form of a cation exchange resin.

EXAMPLE 22

In place of the 18.1 g of 5-aminoisophthalic acid used in Example 8 there is used 15.1 g of 2-amino-5-methylbenzoic acid. The product consisted of a mixture of 1-hydroxy-2-(4-[2-carboxy-4-methylphenylazo]-6-carboxynaphth-1-ylazo)-3-sulpho-7-aminonaphthalene and 1-hydroxy-2-(4-[2-carboxy-4-methylphenylazo]-7-carboxynaphth-1-ylazo)-3-sulpho-7-aminonaphthalene. It was converted to the mixed ammonium-sodium salt by the method of Example 3. When made into an ink and printed onto plain paper using a thermal ink jet printing machine the printed image showed very high resistance to water.

EXAMPLE 23

In place of the 18.1 g of 5-aminoisophthalic acid used in Example 8 there is used 15.1 g of 3-amino-4-methylbenzoic acid. The product consisted of a mixture of 1-hydroxy-2-(4-[2-methyl-5-carboxyphenylazo]-6-carboxynaphth-1-ylazo)-3-sulpho-7-aminonaphthalene and 1-hydroxy-2-(4-[2-methyl-5-carboxyphenylazo]-7-carboxynaphth-1-ylazo)-3-sulpho-7-aminonaphthalene. It was converted to the mixed ammonium-sodium salt by the method of Example 3. When made into an ink and printed onto plain paper using a thermal ink jet printing machine the printed image showed very high resistance to water.

EXAMPLE 24

In place of the 18.1 g of 5-aminoisophthalic acid used in Example 8 there is used 17.1 g of 2-amino-4-chlorobenzoic acid. The product consisted of a mixture of 1-hydroxy-2-(4-[2-carboxy-5-chlorophenylazo]-6-carboxynaphth-1-ylazo)-3-sulpho-7-aminonaphthalene and 1-hydroxy-2-(4-[2-carboxy-5-chlorophenylazo]-7-carboxynaphth-1-ylazo)-3-sulpho-7-aminonaphthalene. It was converted to the mixed ammonium-sodium salt by the method of Example 3. When made into an ink and printed onto plain paper using a thermal ink jet printing machine the printed image showed very high resistance to water.

EXAMPLE 25

In place of the 18.1 g of 5-aminoisophthalic acid used in Example 8 there is used 16.7 g of 2-amino-4-methoxybenzoic acid. The product consisted of a mixture of 1-hydroxy-2-(4-[2-methoxy-5-carboxyphenylazo]-6-carboxynaphth-1-ylazo)-3-sulpho-7-aminonaphthalene and 1-hydroxy-2-(4-[2-methoxy-5-carboxyphenylazo]-7-carboxynaphth-1-ylazo)-3-sulpho-7-aminonaphthalene. It was converted to the mixed ammonium-sodium salt by the method of Example 3. When made into an ink and printed onto plain paper using a thermal ink jet printing machine the printed image showed very high resistance to water.

EXAMPLE 26

In place of the 18.1 g of 5-aminoisophthalic acid used in Example 8 there is used 21.7 g of 2-amino-4-sulphobenzoic acid. The product consisted of a mixture of 1-hydroxy-2-(4-[2-carboxy-5-sulphophenylazo]-6-carboxynaphth-1-ylazo)-3-sulpho-7-aminonaphthalene and 1-hydroxy-2-(4-[2-carboxy-5-sulphophenylazo]-7-carboxynaphth-1-ylazo)-3-sulpho-7-aminonaphthalene. It was converted to the mixed ammonium-sodium salt by the method of Example 3. When made into an ink and printed onto plain paper using a thermal ink jet printing machine the printed image showed high resistance to water.

EXAMPLE 27

In place of the 18.1 g of 5-aminoisophthalic acid used in Example 8 there is used 21.7 g of 2-amino-5-sulphobenzoic acid. The product consisted of a mixture of 1-hydroxy-2-(4-[2-carboxy-4-sulphophenylazo]-6-carboxynaphth-1-ylazo)-3-sulpho-7-aminonaphthalene and 1-hydroxy-2-(4-[2-carboxy-4-sulphophenylazo]-7-carboxynaphth-1-ylazo)-3-sulpho-7-aminonaphthalene. It was converted to the mixed ammonium-sodium salt by the method of Example 3. When made into an ink and printed onto plain paper using a thermal ink jet printing machine the printed image showed high resistance to water.

We claim:

1. An ink comprising an effective amount of a dye to color said ink of Formula I, or a salt thereof, and an aqueous medium, said Formula I being the following:

$$\text{Formula I}$$

wherein
W is COOH
X is selected from the group consisting of H, COOH, $SO_3H$, halo, nitro, cyano, $C_{1-6}$-alkyl, $C_{1-6}$-acylamino;
Y is H, COOH or $SO_3H$;
Z is H, COOH or $SO_3H$;
R is H or $C_{1-6}$-alkyl; and
$R^1$ is H or $C_{1-6}$-alkyl;
provided that there are at least two COOH groups and that the number of COOH groups is equal to or greater than the number of $SO_3H$ groups.

2. An ink comprising an effective amount of a dye of to color said ink Formula II, or a salt thereof, and an aqueous medium, said Formula II being the following:

$$\text{Formula II}$$

wherein
Y is H, COOH or $SO_3H$; and
Z is H, COOH or $SO_3H$; provided Y and Z are not both —$SO_3H$.

3. An ink according to claim 2 wherein Y and Z are both H.

4. An ink according to claim 2 wherein Y is H and Z is $sO_3H$.

5. An ink according to claim 2 comprising a mixture of said dyes, in one of which Y is $SO_3H$ and Z is H, and in the other Y is H and Z is $SO_3H$.

6. An ink according to claim 2 comprising a mixture of said dyes in one of which Y is COOH and Z is H, and in the other Y is H and Z is COOH.

7. An ink according to claim 1 in which the amount of dye is from 0.5% to 20% by weight based on the total weight of the ink.

8. An ink according to claim 1 wherein the aqueous medium is water or a mixture of water with a water-soluble organic solvent.

9. An ink according to claim 8 wherein the water-soluble organic solvent is selected from the group consisting of $C_{1-4}$-alkanols, $C_{2-6}$alkyleneglycols, polyethylene glycols with molecular weights up to 500, glycerol, 1,2,6-hexanetriol, tetrahydrofuran, dimethylformamide, dimethylacetamide and lower alkylethers of polyhydric alcohols containing 2, 3 or 4 $CO_2H$ groups.

10. An ink according to claim 1 wherein the dye is in the form of its salt with at least one of the basic compounds selected from the group consisting of alkali metals, ammonia, methylamine, dimethylamine, trimethylamine, ethylamine, n-propylamine, iso-propylamine, n-butylamine, iso-butylamine, sec-butylamine, tert-butylamine, piperidine, pyridine, morpholine, allylamine, diethylamine and triethylamine.

11. An ink according to claim 1 wherein the dye is in the form of its sodium, ammonium, or mixed sodium-/ammonium salt.

12. An ink comprising, by wt %:
(a) from about 0.5% to about 20% dye which, in the free acid state, corresponds to the formula $$\text{Formula I}$$

wherein
W is COOH,
X is H or COOH,
Y is H, COOH, or $SO_3H$,
Z is H, COOH, or $SO_3H$, and
R is H, $CH_2COOH$, or $CH_2CH_2COOH$;
provided that there are at least two COOH groups and that the number of COOH groups is equal to or greater than the number of $SO_3$ groups,
(b) 10% to 40% of a water soluble organic solvent for said dye, and
(c) water.

13. An ink of claim 12 wherein the dye is present in the form of its alkali metal salt, its ammonium or substituted ammonium salts.

14. An ink of claim 13 wherein the alkali metal is Na.

15. An ink of claim 13 wherein the ammonium or substituted ammonium salt is $NH_4$, $(CH_3)_3NH$, $(CH_3)_2NH_2$ and $CH_3NH_3$.

16. An ink of claim 12 wherein there are at least two COOH groups attached directly to aromatic carbon atoms.

17. An ink of claim 13 wherein W is in the para position with respect to the azo group when X is H.

18. An ink of claim 13 wherein X is COOH and X and W are in the 3,5-, 3,4-, or 2,5- position with respect to the azo group.

19. An ink of claim 13 wherein there are more COOH groups than $SO_3H$ groups.

20. An ink of claim 13 having a pH from about 7.5 to 9.

21. An ink of claim 13 wherein there is present an ammonium salt.

22. An ink comprising, by wt %:
(a) from about 1% to about 10% dye corresponding to the formula $$\text{Formula I}$$

wherein
W is COOH,
X is H, or COOH,
Y and Z are H, COOH, or $SO_3H$, and
R is H, $CH_2COOH$, or $CH_2CH_2COOH$;

provided that there are at least two COOH groups and that the number of COOH groups is equal to or greater than the number of SO₃ groups, and (b) water, wherein the ink has a pH from about 7.5 to 9.

23. An ink comprising, by wt %:
(a) from about 1% to about 10% dye corresponding to the following formula

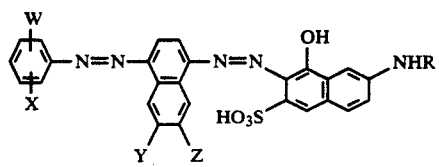

wherein
W is COOH,
X is H, COOH, or SO₃H,
Z and Y are H, COOH, or SO₃H, and
R is CH₂COOH, or CH₂CH₂COOH;
provided that there are at least two COOH groups and that the number of COOH groups is equal to or greater than the number of SO₃ groups, (b) about 10% to 40% water-soluble organic solvent, and (c) water, wherein the ink has a pH from about 7.5 to 9.

24. An ink of claim 23 wherein the water-soluble organic solvent is an alkanol having from 1 to 4 carbon atoms, an amide, a ketone, a ketone alcohol, an ether, a polyalkylene glycol, an alkylene glycol, an alkylene thioglycol, thiodiglycol, hexylene glycol, diethylene glycol, a polyol, and a lower alkyl ether of a polyhydric alcohol.

25. An ink of claim 24 wherein the organic solvent is diethylene glycol.

* * * * *